United States Patent
Kohli

(10) Patent No.: US 10,607,224 B2
(45) Date of Patent: Mar. 31, 2020

(54) SYSTEMS AND METHODS FOR SECURE AUTHENTICATION OF TRANSACTIONS INITIATED AT A CLIENT DEVICE

(71) Applicant: MasterCard International Incorporated, Purchase, NY (US)

(72) Inventor: Manoneet Kohli, O'Fallon, MO (US)

(73) Assignee: MASTERCARD INTERNATIONAL INCORPORATED, Puchase, NY (US)

( * ) Notice: Subject to any disclaimer, the term of this patent is extended or adjusted under 35 U.S.C. 154(b) by 779 days.

(21) Appl. No.: 15/090,370

(22) Filed: Apr. 4, 2016

(65) Prior Publication Data

US 2017/0286966 A1 Oct. 5, 2017

(51) Int. Cl.
G06Q 20/40 (2012.01)
G06Q 20/32 (2012.01)
G06Q 20/38 (2012.01)

(52) U.S. Cl.
CPC ... *G06Q 20/40145* (2013.01); *G06Q 20/3226* (2013.01); *G06Q 20/38215* (2013.01); *G06Q 20/407* (2013.01)

(58) Field of Classification Search
CPC .............................................. G06Q 20/40145
See application file for complete search history.

(56) References Cited

U.S. PATENT DOCUMENTS 6,697,947 B1 * 2/2004 Matyas, Jr. ........... H04L 9/3231
380/282
7,600,676 B1 * 10/2009 Rados ................... G06Q 20/40
705/75
8,715,066 B2 5/2014 Prather et al.
8,979,644 B2 3/2015 Warner
9,058,620 B1 6/2015 Boyle et al.
9,129,314 B1 9/2015 Boyle et al.
9,183,549 B2 11/2015 Kapur et al.
10,091,007 B2 * 10/2018 Kohli .................. G06Q 20/382
(Continued)

FOREIGN PATENT DOCUMENTS

| KR | 100974028 B1 | 8/2010 |
| WO | 2009073900 A2 | 6/2009 |
| WO | 2014174506 A1 | 10/2014 |

*Primary Examiner* — Jacob C. Coppola
(74) *Attorney, Agent, or Firm* — Armstrong Teasdale LLP

(57) ABSTRACT

A method for authenticating a cardholder for a candidate purchase using an authentication computing device in communication with a memory is provided. The method includes receiving an authentication profile associated with the cardholder during an enrollment process for an authentication service, storing the authentication profile within the memory, and receiving an authentication request for the candidate purchase over a first communication link. The candidate purchase is initiated at a client device. The method further includes retrieving the stored authentication profile from the memory, generating a challenge message based on the stored authentication profile, transmitting the challenge message to a user device over a second communication link, receiving a challenge response including authentication information collected from the user device, comparing the collected authentication information to the stored authentication profile, and authenticating the cardholder for the candidate purchase based on the comparison.

20 Claims, 6 Drawing Sheets

(56) References Cited

U.S. PATENT DOCUMENTS

| | | | |
|---|---|---|---|
| 2002/0123938 A1* | 9/2002 | Yu | G06Q 30/06 705/26.43 |
| 2003/0101134 A1* | 5/2003 | Liu | G06Q 20/04 705/39 |
| 2003/0115142 A1 | 6/2003 | Brickell et al. | |
| 2003/0158960 A1* | 8/2003 | Engberg | G06Q 20/02 709/237 |
| 2004/0044627 A1* | 3/2004 | Russell | G06Q 20/00 705/50 |
| 2004/0104266 A1* | 6/2004 | Bolle | G06Q 20/40 705/18 |
| 2004/0243514 A1* | 12/2004 | Wankmueller | G06Q 20/04 705/40 |
| 2005/0075985 A1* | 4/2005 | Cartmell | G06Q 20/04 705/67 |
| 2006/0173776 A1* | 8/2006 | Shalley | G06Q 20/10 705/39 |
| 2007/0180100 A1* | 8/2007 | Biggs | G06F 21/554 709/224 |
| 2008/0086770 A1* | 4/2008 | Kulkarni | H04L 63/0876 726/20 |
| 2008/0154770 A1* | 6/2008 | Rutherford | G06Q 20/04 705/44 |
| 2008/0195499 A1 | 8/2008 | Meredith et al. | |
| 2008/0223918 A1 | 9/2008 | Williams et al. | |
| 2009/0171805 A1* | 7/2009 | Gould | G06Q 20/40 705/26.1 |
| 2009/0187492 A1* | 7/2009 | Hammad | G06Q 20/20 705/26.1 |
| 2009/0193514 A1* | 7/2009 | Adams | G06F 21/32 726/17 |
| 2010/0114733 A1* | 5/2010 | Collas | G06Q 20/12 705/26.1 |
| 2010/0125737 A1* | 5/2010 | Kang | G06Q 20/12 713/176 |
| 2010/0145861 A1 | 6/2010 | Law et al. | |
| 2010/0293094 A1 | 11/2010 | Kolkowitz et al. | |
| 2011/0145899 A1 | 6/2011 | Cao et al. | |
| 2012/0019361 A1* | 1/2012 | Ben Ayed | G06F 21/32 340/5.83 |
| 2012/0095905 A1* | 4/2012 | Hodges | G06Q 20/027 705/39 |
| 2012/0271764 A1 | 10/2012 | Chen | |
| 2012/0278241 A1 | 11/2012 | Brown et al. | |
| 2013/0030941 A1 | 1/2013 | Meredith et al. | |
| 2013/0151358 A1 | 6/2013 | Ramalingam | |
| 2013/0151419 A1 | 6/2013 | Hitchcock et al. | |
| 2013/0240622 A1 | 9/2013 | Zhou | |
| 2014/0172710 A1 | 6/2014 | Brody et al. | |
| 2015/0032621 A1 | 1/2015 | Kar et al. | |
| 2015/0106216 A1 | 4/2015 | Kenderov | |
| 2016/0019547 A1 | 1/2016 | Gurnani et al. | |
| 2016/0142394 A1* | 5/2016 | Ullrich | H04W 4/043 726/7 |

* cited by examiner

SYSTEMS AND METHODS FOR SECURE AUTHENTICATION OF TRANSACTIONS INITIATED AT A CLIENT DEVICE

BACKGROUND

The field of the present disclosure relates generally to authentication and, more particularly, to systems and methods for authenticating a remote transaction using authentication information from a user computing device.

Merchants of online products such as video games are often on the front lines of managing unauthorized payment card transactions. For example, a child using a game console may use a payment card to purchase video games without the consent of the cardholder (e.g., a parent of the child). Online businesses or merchants which offer sales online face a unique challenge because such purchases are made through a "card not present" transaction. In other words, purchases are made without a merchant being able to confirm that the cardholder has given consent to make the purchases. Even some security measures such as requesting a password may not prevent unauthorized transactions. For example, a child may already know the cardholder's password to overcome the security measure.

In a card-not-present transaction, the merchant releases the items purchased with an understanding that the actual cardholder authorized the purchase and that the actual cardholder will make the necessary payment in the case of purchasing a videogame, the items purchased are often delivered digitally to a gaming device (e.g., game console, computer, smartphone, tablet, etc.) used to initiate the purchase. Due to the anonymity of the purchaser during such an online transaction, unauthorized purchases often occur. That is, unauthorized users may purchase items online using the cardholder's account information. In some cases, an unauthorized user only needs the card number itself to make an online purchase. Some gaming devices even store payment card information to facilitate repeated purchases at the gaming device. However, because the payment card information input by the unauthorized user is drawn to a valid account, a merchant is typically unaware of the unauthorized purchase until after the fact.

Although the valid cardholder may want to prevent any unauthorized card-not-present transactions, the valid cardholder may wish to enable unauthorized users to request permission to make purchases using the payment card. For example, the cardholder may want to enable the cardholder's children to make purchases on a gaming console once the cardholder has reviewed and approved the potential purchases.

Therefore, an authentication system is needed which is capable of verifying that the valid cardholder approves of an online purchase initiated with the cardholder's account.

BRIEF DESCRIPTION

In one aspect, method for authenticating a cardholder for a candidate purchase using an authentication computing device in communication with a memory is provided. The method includes receiving an authentication profile associated with the cardholder during an enrollment process for an authentication service, storing the authentication profile within the memory, and receiving an authentication request for the candidate purchase over a first communication link. The candidate purchase is initiated at a client device and the authentication request indicates an initiator is authorized to make the candidate purchase by the cardholder. The method further includes retrieving the stored authentication profile from the memory, generating a challenge message based on the stored authentication profile, transmitting the challenge message to a user device over a second communication link, receiving a challenge response including authentication information collected from the user device, comparing the collected authentication information to the stored authentication profile, and authenticating the cardholder for the candidate purchase based on the comparison. The first communication link is different than the second communication link.

In another aspect, an authentication computing device for authenticating a cardholder for a candidate purchase associated with the cardholder is provided. The authentication computing device includes a processor and a memory in communication with the processor. The processor is programmed to receive authentication profile associated with the cardholder during an enrollment process for an authentication service, store the authentication profile within the memory, and receive an authentication request for the candidate purchase over a first communication link. The candidate purchase is initiated at a client device and the authentication request indicates an initiator is authorized to make the candidate purchase by the cardholder. The processor is further programmed to retrieve the stored authentication profile from the memory, generate a challenge message based on the stored authentication profile, transmit the challenge message to a user device over a second communication link different from the first communication link, receive a challenge response including authentication profile collected from the user device, compare the collected authentication profile to the stored authentication profile, and authenticate the cardholder for the candidate purchase based on the comparison.

In yet another aspect, computer-readable storage media for authenticating a cardholder for a candidate purchase associated with the cardholder is provided. The computer-readable storage media has computer-executable instructions embodied thereon. When executed by at least one processor, the computer-executable instructions cause the processor to receive authentication profile associated with the cardholder from the cardholder during an enrollment process for an authentication service, store the authentication profile in a memory in communication with the processor, and receive an authentication request for the candidate purchase over a first communication link. The candidate purchase is initiated at a client device and the authentication request indicates an initiator is authorized to make the candidate purchase by the cardholder. The computer-executable instructions further cause the processor to retrieve the stored authentication profile from the memory, generate a challenge message based on the stored authentication profile, transmit the challenge message to a user device over a second communication link different from the first communication link, receive a challenge response including authentication profile collected from the user device, compare the collected authentication profile to the stored authentication profile, and authenticate the cardholder for the candidate purchase based on the comparison.

BRIEF DESCRIPTION OF THE DRAWINGS

FIG. 1 is a schematic diagram illustrating an example multi-party payment processing system used to authenticate a card-not-present (CNP) transaction initiated at a client device.

FIG. 2 is a simplified block diagram of the authentication system shown in FIG. 1.

FIG. 3 is an expanded block diagram of an example embodiment of a client device for use in the system shown in FIG. 2.

FIG. 4 illustrates an example configuration of a host system for use in the system shown in FIG. 2.

FIG. 5 is a flowchart of an example process for authenticating a cardholder for a purchase initiated at a client device that is performed by the authentication system of FIG. 2, in accordance with one example embodiment of the present disclosure.

FIG. 6 is a diagram of components of one or more example computing devices that may be used in embodiments of the described systems and methods.

DETAILED DESCRIPTION

Figure 1:
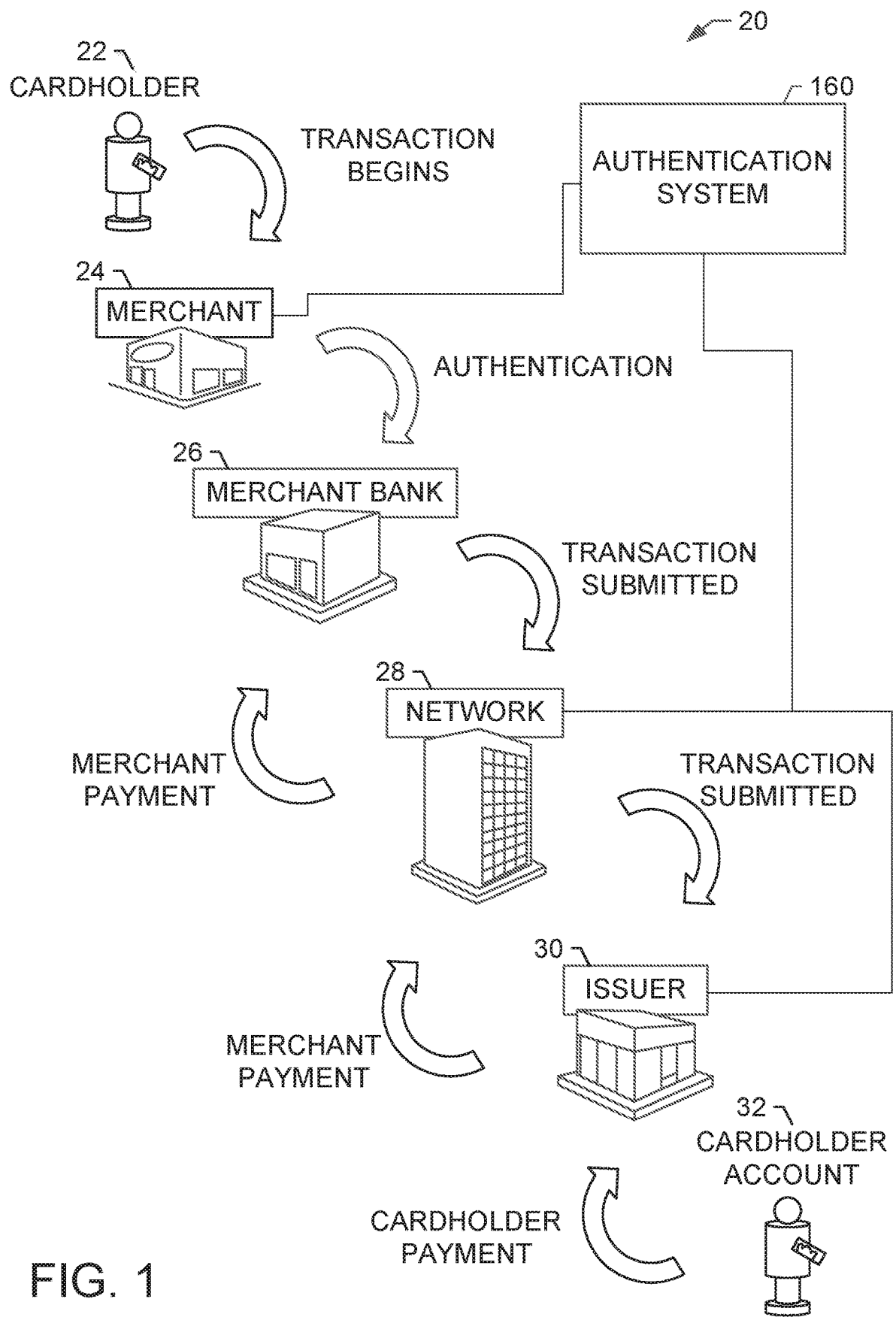
FIGS. 1-6 show example embodiments of the methods and systems described herein.

The field of the present disclosure relates generally to authenticating remotely-initiated payments and transactions, and more particularly, to systems and methods for authenticating remote transactions using authentication information from a user device.

The system described herein is configured to authenticate a cardholder's identity for purchases made at a client device. In particular, the system is configured to transmit an authentication challenge message to a user computing device associated with the cardholder when a purchase is initiated at the client device, and authenticate the cardholder based on a response to the authentication challenge. In the example embodiment, the authentication system includes the client device, a user device associated with a cardholder, one or more merchant devices, a payment processor, and an authentication computing device.

As used herein, the client device is a computing device that may be used to make online purchases. In the exemplary embodiment, the client device is configured to facilitate online video game purchases. For example, the client device may be a game console, smartphone, tablet, notebook, laptop, desktop computer, and the like that is configured to play video games and other software applications. The client device may also be configured to provide a gaming service for purchasing video games and other software applications. These purchases may be referred to as card not present (CNP) purchases because the transactions are not performed face-to-face but are instead performed online through a network. In other words, the merchant is not able to physically inspect a payment card of the cardholder nor is the payment card capable of being swiped through a point of sale device of the merchant. The client device may store payment card information to facilitate repeated purchases through the client device. The client device may enable others besides the cardholder to initiate purchases with the payment card information as described herein. For example, a child of the cardholder may initiate a purchase from the client device. As used herein, "initiator" refers to a user that initiates a purchase through the client device. The initiator may be the cardholder or another user of the client device.

The user device is a computing device associated with the cardholder, for example, a smartphone, a tablet, a phablet, a notebook, a smartwatch, and the like. In the example embodiment, the user device is a smartphone of the user. The user device includes a processor and a memory in communication with the processor. The user device may also include other components such as a display, a fingerprint reader, and a camera to receive or generate authentication information from the cardholder as described herein. The user device communicates with the authentication system through a first communication link while the client device communicates with the authentication system through a second communication link different from the first communication link. That is, the user device and the client device communicate with the authentication independent of each other. Independent communication enables the user device to be located remotely or locally from the client device without losing the functions described herein. For example, if the initiator is a child using a cardholder's payment information to make a purchase at the client device, the cardholder may remotely view and approve the purchase as described herein. The first and second communication links may use a cellular network, an online network (e.g., internet), or another form of wide area communication networks. In some embodiments, the first and second communication links use different communication networks. In other embodiments, the first and second communication links may use the same communication network.

The merchant device is in communication with the client device and the user device. In the example embodiment, the merchant device is a computing device associated with a merchant providing one or more purchasable products at the client device. For example, the merchant may provide video game software, software applications, other multimedia products (e.g., movies and music), and micro-transactions (i.e., transactions within video games and other software applications) purchasable through the client device. In certain embodiments, the merchant may be associated with an online service that facilitates online purchases through the client device, such as the gaming service. The merchant device receives transaction data from the client device for at least some purchases initiated at the client device. The transaction data may include a transaction amount, the products purchased, a time and date, a cardholder identifier, a merchant identifier, and other data associated with transactions.

The authentication computing device includes a processor and a memory. In the example embodiment, the authentication computing device is associated with, in communication with, and/or integral to the payment processor configured to process transactions initiated at the client device using payment information from payment cards (e.g., credit cards, debit card, prepaid cards, etc.). The authentication computing device may include one or more host computing systems that store authentication information associated with a plurality of cardholders.

During at least some transactions initiated at the client device, at least one party to the transaction (e.g., the merchant, merchant bank, or issuer of the payment card) initiates an authentication process. The authentication process is designed to prevent fraudulent and other unauthorized transactions by authenticating the identity of the cardholder. At least one such authentication process is the 3-D Secure® (Visa International Service Association, Delaware) (3DS) protocol (e.g., MasterCard SecureCode® (MasterCard International Incorporated, Purchase, N.Y.)). Upon authentication of the cardholder's identity, the authentication service provides an indication of authentication (sometimes with a score or level of confidence) to the authentication-initiating party. The transaction may then be resumed and transmitted for an authorization process. The payment processor collects transaction data associated with these transactions (e.g., authentication and/or authorization) for further processing.

In the example embodiment, the authentication computing device is associated with an authentication service. The authentication service may be provided to merchants, merchant banks, and/or issuers by a payment processing network and/or by another third party. The authentication computing device is further in communication with the one or more merchant devices, wherein a subset of the merchant devices are each associated with a merchant known to provide products or services purchasable from the client device. In one embodiment, the authentication computing device may store, receive, retrieve, and/or otherwise access a lookup table including the merchant devices.

At the time of issuing a payment card to a cardholder, or at a later time, the cardholder may enroll the payment card account for the authentication service. During an enrollment process, cardholder information (e.g., biometric information) and device information (e.g., a device ID) of the user device are provided to the authentication computing device. The information of the user device may be stored to be used as authentication information as described herein. The cardholder may also specify which authentication information is used to authenticate the cardholder. The authentication computing device is configured to store the authentication information as part of an authentication profile of the cardholder. Once the user device and the registered account are enrolled, the authentication computing device may push an authenticator application to the user device and the authenticator application is installed on the user device.

The client device and/or the merchant devices may be configured to store one or more user accounts associated with users of the client device. The user accounts are used to maintain a user's profile and payment information for purchases made on the client device. The users may include, for example, the cardholder and others associated with the cardholder, such as children of the cardholder. When registering a user account, the user may be given an option to enroll the user account in the authentication service. In some embodiments, the authentication computing device may be configured to identify an existing authentication profile based, at least in part, on the payment information or user information of the user account. If an existing authentication profile does not exist, the user may be directed through the enrollment process to provide the authentication information of the user device for authentication attempts.

Subsequently, when the cardholder or another user initiates a purchase at the client device, the merchant device or another computing device (e.g., the authentication computing device) is configured to detect whether or not the account used to initiate the purchase is enrolled with the authentication service. In at least some embodiments, the purchase may be initiated by an unauthorized requestor (i.e., a user other than the cardholder that does not have permission to initiate the purchase from the cardholder), such as a child. If the user account is enrolled, the merchant device may push a purchase request notification to the user device indicating that an online purchase at the client device has been initiated. The purchase request notification may be an email, a text message, a phone call, a notification from an app running on the user device, or a different notification platform. The purchase request notification may include additional information about the purchase such as, but not limited to, a price of the initiated purchase, a title and/or brief description of the video game or app, hours played, customer reviews, content ratings, and an identity of the requestor that initiated the purchase. In some implementations, the purchase request notification may include a link to direct the cardholder to the additional information within an app (e.g., the authenticator app) or web browser on the user device.

The purchase request notification includes a prompt for the cardholder to approve or decline the initiated purchase. The cardholder selects an option from the purchase request notification and the user device transmits a response to the merchant device. If the cardholder does not select an option within a predetermined period of time (e.g., ten minutes), the purchase request notification may expire and the purchase may be automatically declined. At this point, if the cardholder approved the purchase, at least one of the merchant device, the payment processor, the authentication computing device, and/or another computing device associated with the purchase may detect that the user account of the cardholder is enrolled in the authentication service. In at least some embodiments, the merchant device, the user device, and/or the payment processor may be configured to transmit an authorization request to the authentication computing device to initiate an authentication process for the purchase. The authorization request may indicate whether or not the cardholder has approved the purchase.

The authentication computing device is configured to receive and/or retrieve information associated with the cardholder from the enrollment process to authenticate the cardholder. For example the authentication computing device may identify what authentication method (e.g., device authentication, biometric authentication) the cardholder selected during enrollment. The challenge message is configured to request authentication information from the user device and/or the cardholder as describe herein.

The user device receives the challenge message from the authentication computing device. The challenge message requests authentication information from the cardholder, such as, but not limited to, biometric information, device information, and cardholder information. In one example, in response to the challenge message from the authentication computing device, the user device may prompt the cardholder to input the authentication information. For example, the user device may prompt the cardholder to input biometric information such as a fingerprint. In another example, the user device may prompt the cardholder to take a picture of his or her face to verify the cardholder's identity.

Alternatively, the user device may automatically provide the authentication information if the cardholder selected a device authentication method. In such an example, the user device may be configured to decrypt an encrypted input within the challenge message from the device authentication server. The user device may store an encryption key that, when used on the encrypted input, decrypts the input. The user device may process the decrypted input accordingly to verify and authenticate the cardholder. In another example, the user device may store a unique identifier that may be provided in response to the challenge message.

In yet another example, the challenge message may request that the user device collects authentication information through a paired device. Pairing may include a process of authenticating two devices to ensure that wireless communication and security is established between the two devices. Devices that have been paired may automatically recognize each other and connect, disconnect, and the like, with ease. By pairing, devices may be connected to each other and/or networks via different wireless protocols, for example, Bluetooth, WiFi, and the like. Examples of devices that may be paired with each other include smartphones, tablets, phablets, smartwatches, smartbands, smartglasses, keyboards, printers, smart televisions, remote controllers, laundry machines, refrigerators, dishwashers, and the like. The paired device may include one or more of a display such as a touch screen, a camera, a microphone, a sensor, and the like, which may be used by a cardholder to input biometric information that can be used to identify a person.

In the example embodiment, the user device generates a challenge response with the collected authentication information and transmits the challenge response to the authentication computing device. The authentication computing device compares the authentication information from the challenge response to the stored authentication information from the enrollment process to determine if the cardholder is authenticated. For example, the authentication computing device may determine whether or not the authentication information from the challenge response and the stored authentication information from the enrollment process substantially match.

If the authorization process authenticates the cardholder's identity, the transaction may be processed and enter a transaction lifecycle including authorization, clearing, and settlement processes. If the transaction is approved, the merchant may release the purchased product to the client device. However, if the authentication is unsuccessful (e.g., if no challenge response is received), the transaction may be declined. In some implementations, the cardholder may have a predetermined time limit to respond to the challenge message, and if the time limit is exceeded, the authentication is automatically considered unsuccessful. Accordingly, the transaction may not enter the transaction lifecycle and may be ended.

During authentication, the client device may detect a status of the purchase (e.g., approved, declined, authenticated, or pending) and indicate the status to the user that initiated the purchase on the client device. For example, the client device may detect if the purchase request notification has been approved or declined and whether or not the cardholder was authenticated. If the purchase is declined, the client device may provide an explanation or reason the transaction was declined to the user.

In the example embodiment, from the purchase being initiated to authentication, the steps described above are process in substantially real-time or within a predetermined period of time (e.g., seconds, minutes, or hours). As used herein "instantaneous" or "real-time" refers outcomes occurring at a substantially short period after an input. The time period is a result of the capability of the system implementing processing of inputs to generate an outcome. Events occurring instantaneously occur without substantial intentional delay. Accordingly, the cardholder may approve the purchase and be authenticated in time to enter the transaction lifestyle.

The methods and systems described herein may be implemented using computer programming or engineering techniques including computer software, firmware, hardware or any combination or subset thereof, wherein the technical effects may be achieved by performing one of the following steps: (a) receiving authentication information associated with a cardholder during an enrollment process for an authentication service; (b) storing the authentication information from the enrollment process; (c) receiving an authentication request for a candidate purchase of the cardholder, the candidate purchase initiated at a client device; (d) retrieving the stored authentication information; (e) generating a challenge message based on the stored authentication information; (f) transmitting the challenge message to at least one of a user device associated with the cardholder, a merchant device, and an issuer device; (g) receiving a challenge response including authentication information collected from the user device; (h) comparing the collected authentication information to the stored authentication information; and (i) authenticating the cardholder for the candidate purchase based on the comparison.

The systems and methods described herein are configured to facilitate (a) enhanced review options for cardholders for remote CNP transactions; (b) improved authentication methods for CNP transactions; (c) increased confidence of the merchants and issuing banks that the cardholder has approved a purchase; and (d) purchase approval and authentication occurring real-time or within a predetermined period of time.

Described herein are computer systems such as a client device, a user device, a merchant device, an authentication computing device, a payment processor, an issuer computing device, and related systems. As described herein, all such computer systems include a processor and a memory.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

The following detailed description illustrates embodiments of the disclosure by way of example and not by way of limitation. It is contemplated that the disclosure has general application to authenticate remote purchases via a user device.

FIG. 1 is a schematic diagram illustrating an example multi-party payment card system 20 for enabling device to device authentication in online payment card transactions. The present disclosure relates to payment card system 20, such as a credit card payment system using the MasterCard® payment card system payment network 28 (also referred to as an "interchange" or "interchange network"). MasterCard® payment card system payment network 28 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In payment card system 20, a financial institution such as an issuer 30 issues a payment card for an account, such as a credit card account or a debit card account, to a cardholder 22, who uses the payment card to tender payment for a purchase from a merchant 24. To accept payment with the payment card, merchant 24 must normally establish an account with a financial institution that is part of the financial payment system. This financial institution is usually called the "merchant bank" or the "acquiring bank" or "acquirer bank" or simply "acquirer". When a cardholder 22 tenders payment for a purchase with a payment card (also known as a financial transaction card), merchant 24 requests authorization from acquirer 26 for the amount of the purchase. Such a request is referred to herein as an authorization request message. The request may be performed over the telephone, but is usually performed through the use of a point-of-interaction terminal, also referred to herein as a point-of-sale device, which reads the cardholder's account information from the magnetic stripe on the payment card and communicates electronically with the transaction processing computers of acquirer 26. Alternatively, acquirer 26 may authorize a third party to perform transaction processing on its behalf. In this case, the point-of-interaction terminal will be configured to communicate with the third party. Such a third party is usually called a "merchant processor" or an "acquiring processor."

Using payment card system payment network 28, the computers of acquirer 26 or the merchant processor will communicate with the computers of issuer 30, to determine whether the cardholder's account 32 is in good standing and whether the purchase is covered by the cardholder's available credit line or account balance. Based on these determinations, the request for authorization will be declined or accepted. If the request is accepted, an authorization code is issued to merchant 24.

When a request for authorization is accepted, the available credit line or available balance of cardholder's account 32 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 24 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For debit card transactions, when a request for authorization is approved by the issuer, cardholder's account 32 is decreased. Normally, a charge is posted immediately to cardholder's account 32. The bankcard association then transmits the approval to the acquiring processor for distribution of goods/services, or information or cash in the case of an ATM.

After a transaction is captured, the transaction is settled between merchant 24, acquirer 26, and issuer 30. Settlement refers to the transfer of financial data or funds between the merchant's account, acquirer 26, and issuer 30 related to the transaction. Usually, transactions are captured and accumulated into a "batch," which is settled as a group.

For online transactions, an authentication process may also be performed to verify that cardholder 22 is physically present when making an online purchase with cardholder's account 32. In the embodiments described herein, an authentication computing device 160 operated by merchant 24, payment network 28, issuer 30, and/or another third-party facilitates performing an authentication process for online transactions processed using payment card system 20 on a client device (not shown in FIG. 1). To facilitate authentication, authentication computing device 160 is in communication with merchant 24, payment network 28, and issuer 30, as described herein.

Figure 2:
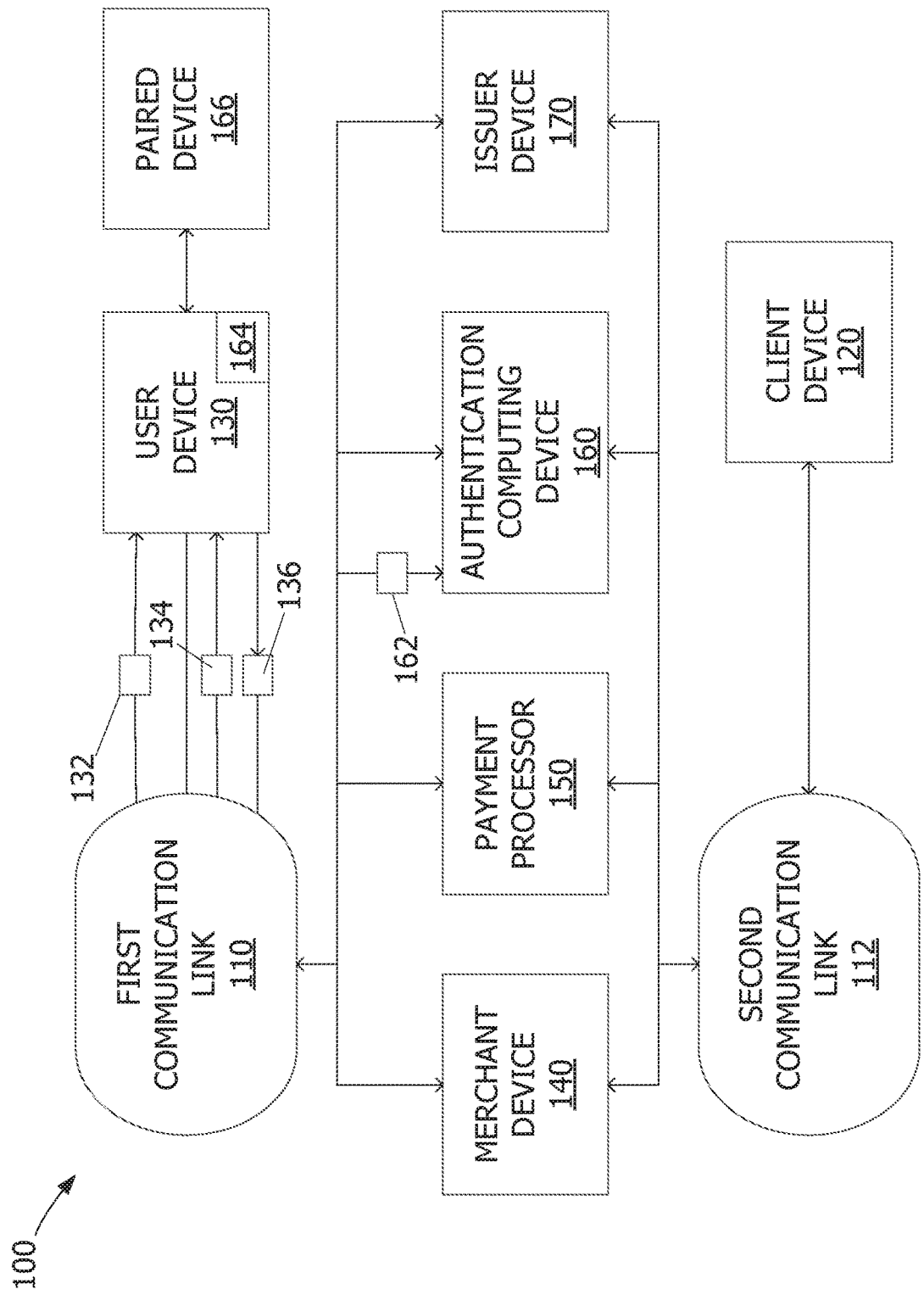

FIG. 2 is a diagram illustrating an example of a remote authentication system 100 that may be used, for example, in payment card system 20 (shown in FIG. 1). Authentication system 100 includes a plurality of computing devices that are connected to each other via a first communication link 110 and a second communication link 112. First and second communication links 110, 112 may use one or more communication networks, such as payment network 28 (shown in FIG. 1) to communicate between the computing device. The computing devices include a client device 120, a user device 130, a merchant device 140 operated by a merchant, such as merchant 24 (shown in FIG. 1), a payment processor 150, authentication computing device 160 and an issuer device 170 operated by an issuing bank, such as issuer 30 (shown in FIG. 1).

In the example embodiment, user device 130 communicates with authentication system 100 through first communication link 110 while client device 120 communicates with authentication system 100 through second communication link 112. First communication link 110 is different from second communication link 112. First and second communication links 110, 112 may use a cellular network, an online network (e.g., internet), or another form of wide area communication networks. In some embodiments, first and second communication links 110, 112 use different communication networks. In other embodiments, first and second communication links 110, 112 may use the same communication network.

Client device 120 is a computing device that is configured to facilitate online or card not present (CNP) purchases through an online merchant service. In the example embodiment, client device 120 is configured to facilitate video game purchases, such as a game console, smartphone, tablet, notebook, laptop, desktop computer, and the like that is configured to play video games and other software applications. In this example, client device 120 includes a gaming service for purchasing video games and other software applications. In the example embodiment, the merchant associated with merchant device 140 is also associated with the gaming service. Additionally or alternatively, client device 120 may be configured to facilitate purchases other than video game purchases, such as clothes, appliances, and other products and services. Client device 120 may store payment card information to facilitate repeated purchases at client device 120. An initiator, such as the cardholder, may use client device 120 to initiate a purchase. The initiator may also be a different user of client device 120 that is unauthorized to use the stored payment information without consent of the cardholder to make purchases. For example, the initiator may be a child or minor associated with the cardholder.

In this example, user device 130 refers to a computing device of a cardholder, for example, a smartphone, a tablet, a phablet, a notebook, a smartwatch, and the like. User device 130 is connected to first communication link 110 to communicate with merchant device 140, payment processor 150, authentication computing device 160, and/or issuer device 170. User device 130 may also be configured to receive or generate authentication information as described further herein.

Merchant device 140, payment processor 150, authentication computing device 160, and issuer device 170 are also connected to first and second communication links 110, 112. In this example, the issuing bank refers to a bank that issued a payment card to the cardholder. At the time of issuing the payment card, or at a later time, the cardholder may register the payment card account for an authentication service associated with authentication computing device 160. In some embodiments, authentication computing device 160 may be a part of merchant device 140, payment processor 150, or issuer device 170.

During an enrollment process, cardholder information (e.g., biometric information) and device information (e.g., a device ID) of user device 120 are provided to authentication computing device 160. Authentication computing device 160 is configured to store the cardholder information and the device information, also referred to as "authentication information" as part of an authentication profile of the cardholder. In some embodiments, authentication computing device 160 includes one or more host computing systems (not shown) to store the authentication information. For example, authentication computing device 160 may include a biometric host system and a device host system for storing the authentication information. In some embodiments, the cardholder may specify a method of authentication to be used for subsequent authentication attempts. Alternatively, a method of authentication may be automatically selected based on the information provided by the cardholder. Once user device 120 is enrolled, authentication computing device 160 may push an authenticator application to user device 120 and the authenticator application may be installed on user device 120.

Client device 120 and/or merchant device 140 are configured to register and store user accounts associated with users of client device 120. The users may include, for example, the cardholder and others associated with the cardholder, such as children. Each registered user account may include payment information for purchases made using the registered user account. When registering a user account, the user may be given an option to enroll the user account in the authentication service. In some embodiments, authentication computing device 160 may be configured to identify an existing authentication profile of the cardholder based, at least in part, on the payment information or user information of the user account. If an existing authentication profile does not exist, the user may be directed through the enrollment process to provide the cardholder information and the device information of user device 130 for subsequent authentication attempts.

When a CNP purchase is initiated at client device 120, one or more of merchant device 140, payment processor 150, authentication computing device 160, and issuer device 170 are configured to detect if the user account associated with the purchase is enrolled in the authentication service. If the user account is enrolled, merchant device 140 and/or another computing device of system 100 is configured to push or transmit a purchase request notification 132 to user device 130 that a purchase has been initiated through client device 120. Purchase request notification 132 may be an email, a text message, a phone call, a notification from an app running on user device 130, or a different notification platform. Purchase request notification 132 may include additional information such as, but not limited to, a price of the initiated purchase, a title and/or brief description of the video game or app, hours played, customer reviews, content ratings, and an identity of the requestor that initiated the purchase. In some implementations, purchase request notification 132 may include a link to direct the cardholder to the additional information within an app or web browser on user device 130.

In this example, purchase request notification 132 includes an input prompt for the cardholder to approve or decline the initiated purchase. That is, purchase request notification 132 enables the cardholder to permit users other than the cardholder (e.g., children of the cardholder) to initiate purchases at client device 120 with the cardholder's payment information and review said purchases before processing without requiring the cardholder to be present at client device 120. System 100 further enables the cardholder to selectively approve the purchases to control how the cardholder's payment information is used. The cardholder selects an option from purchase request notification 132 and user device 130 transmits a response to merchant device 140. In some embodiments, user device 130 transmits the response to a different computing device, such as authentication computing device 160. If the cardholder does not select an option within a predetermined period of time (e.g., ten minutes), purchase request notification 132 may expire and the purchase may be automatically declined.

In the example embodiment, merchant device 140 notifies authentication computing device 160 to begin the authentication process for the cardholder. More specifically, merchant device 140 transmits an authentication request 162 to authentication computing device 160. Authentication request 162 is configured to identify the cardholder, the initiated purchase, and/or whether or not the cardholder approved the purchase. In response to authentication request 162, authentication computing device 160 is configured to retrieve the authentication profile of the cardholder and the authentication information associated with the cardholder to determine a method of authentication (biometric, password, device-to-device, etc.) selected during the enrollment process.

Based on the retrieved authentication profile, authentication computing device 160 is configured to generate a challenge message 134 for user device 130. In other embodiments, authentication computing device 160 may be configured to cause another computing device (e.g., issuer device 170) to generate challenge message 134. Challenge message 134 is transmitted to user device 130. Challenge message 134 is configured to prompt the cardholder and/or user device 130 to provide authentication information that corresponds to the retrieved authentication profile. In one example, challenge message 134 may prompt the cardholder to provide biometric information such as a fingerprint at user device 130 to be compared to biometric information provided during the enrollment process.

In another example, the authenticator application is a locked file 164. Notably, locked file 164 is linked to the cardholder's user profile on user device 130, and is only activated when the cardholder's user profile is active. Accordingly, if another user profile (e.g., a profile for a family member of the cardholder) is currently active on the user device 130, locked file 164 is inactive. Locked file 164 may be for example, an .exe file, an .apk file, or a .bat file. Alternatively, locked file 164 may have any format that enables locked file 164 to function as described herein. In the example embodiment, locked data file 164 runs as a background process whenever the cardholder's user profile is active. When the background process is running, locked data file 164 may be referred to as "open" (i.e., able to receive and process a challenge message). When the cardholder's user profile is not active, the background process does not run, and locked data file 164 is unable to receive and process a challenge message. In alternative embodiments, locked data file 164 is called by a separate authenticator application to process a challenge message received at the authenticator application. The authenticator application is only able to successfully call locked data file 164 if the cardholder's user profile is active.

When the user makes an online purchase at client device 120 using the registered user account, authentication system 100 may perform a device to device authentication for the cardholder using enrolled user device 120. For example, the payment processor 150 may transmit an authentication request 162 to authentication computing device 160, causing authentication computing device 160 to transmit a challenge message 134 to user device 130. Authentication computing device 160 stores, for example, records of user device 130 and records of locked file 164. Authentication computing device 160 generates challenge message 134 based on the stored records.

User device 130 receives challenge message 134 from authentication computing device 160. If the user profile of the cardholder is active, locked file 164 installed as part of the device enrollment is activated, and receives the challenge. Otherwise, locked file 164 does not receive the challenge, preventing the cardholder from being authenticated. In the example embodiment, challenge message 134 is an encrypted message, and locked file 164 is able to decrypt the encrypted message. To authenticate user device 130, locked file 164 processes challenge message 134, generates a challenge response 136, and causes challenge response 136 to be transmitted from user device 120 to the device authentication server.

Locked file 164, in at least some embodiments, uses one or more encryption keys to encrypt and decrypt messages sent to and from authentication computing device 160. For example, locked file 164 may encrypt challenge response 136 before transmission. In the example embodiment, locked file 164 includes two layers of encryption. A first layer of encryption enables locked file 164 to securely communicate with the device authentication server. A second layer of encryption ensures locked file 164 is only activated when the user profile associated with the cardholder is active on user device 130, as described above.

For example, in the example embodiment, locked data file 164 is protected by one or more encryption keys stored on user device 130. The encryption keys may be installed, for example, as part of a device enrollment process. The encryption keys are bound to the cardholder's user profile such that an operating system of user device 130 can only access the encryption keys needed to run locked data file 164 when the cardholder's user profile is active. If the cardholder's user profile is not active, the operating system cannot access the necessary encryption keys, and cannot run locked data file 164. In other embodiments, access to locked data file 164 is limited using other techniques (e.g., using file system access rights).

Challenge message 134 may be any message that locked file 164 is able to generate a challenge response to. For example, in one embodiment, challenge message 134 instructs locked file 164 to perform a mathematical operation, and challenge response 136 includes the result of the mathematical operation. In another embodiment, challenge message 134 requests a device ID (e.g., a MAC address, an IMEI number, etc.) for user device 130, and challenge response 136 includes the requested device ID.

In a further embodiment, challenge message 134 requests locked file 164 confirm a current activated lifetime of locked file 164, and challenge response 136 includes the current activated lifetime. The current activated lifetime is defined as the time difference between the current time (i.e., the time the challenge is received) and the time the locked file 164 was originally received at user device 130. The current activated lifetime is known only to locked file 164 and the authentication computing device 160 transmitting challenge message 134.

In yet another example, challenge message 134 may be configured to authenticate user device 130 using a paired device. Pairing may include a process of authenticating two devices to ensure that wireless communication and security is established between the two devices. Devices that have been paired may automatically recognize each other and connect, disconnect, and the like. By pairing, devices may be connected to each other and/or networks via different wireless protocols, for example, Bluetooth, WiFi, and the like. Examples of devices that may be paired with each other include smartphones, tablets, phablets, smartwatches, smartbands, smartglasses, keyboards, printers, smart televisions, remote controllers, laundry machines, refrigerators, dishwashers, and the like. The paired device may include one or more of a display such as a touch screen, a camera, a microphone, a sensor, and the like, which may be used by a cardholder to input biometric information that can be used to identify a person.

In this example, authentication computing device 160 is configured to issue challenge message 134 to user device 130. Challenge message 134 may be configured for biometric, device, or another method of authentication. User device 130, acting as a beacon, pushes challenge message 134 to one or more paired devices 166 within a predetermined range of user device 130. In some embodiments, user device 130 may selectively transmit challenge message 134 to at least one paired device 166. For example, user device 130 may be configured to determine if paired device 166 is configured to provide a corresponding challenge response to challenge message 134. For example, a smartwatch may not be configured to receive biometric information and therefore does not receive a biometric challenge message. In other embodiments, challenge message 134 is automatically pushed to each paired device 166.

In response to receiving the challenge, paired device 166 may transmit a response to user device 130 indicating that paired device 166 is available or is not available for performing authentication. In some embodiments, if paired device 166 is capable of performing authentication, paired device 166 may wait until receiving an input from the cardholder, such as a biometric input. For example, the input mechanism may be a camera configured to capture an image of the cardholder or a portion of the cardholder (e.g., the cardholder's face). As another example, an input mechanism of paired device 166 may include a sensor configured to sense a pulse, heart rate, blood pressure, and the like, of the cardholder. It should also be appreciated that paired device 166 may include any sensor or other data capturing element for capturing biometric information of the cardholder. As another example, the biometric information may be based on a cardholder input including hand geometry, earlobe geometry, retina and iris patterns, voice waves, keystroke dynamics, DNA, signatures, and the like. Alternatively, paired device 166 may automatically provide authentication information, such as device information of user device 130 or paired device 166. In response to collecting the authentication information from the cardholder and/or paired device 166, paired device 166 may transmit the collected authentication information to user device 130.

In the example embodiment, once authentication information has been collected, user device 130 is configured to generate a challenge response with the collected authentication information. Challenge response 136 is transmitted to one or more of merchant device 140, payment processor 150, authentication computing device 160, and/or issuer computing device 170 to determine if the cardholder is authenticated or declined. More specifically, merchant device 140, payment processor 150, authentication computing device 160, and/or issuer computing device 170 are configured to compare the collected authentication information to the authentication profile associated with the cardholder to determine whether or not the cardholder is authenticated. In some embodiments, the cardholder is authenticated if the collected authentication information and the stored authentication information from the authentication profile substantially match. In certain embodiments, merchant device 140, payment processor 150, authentication computing device 160, and/or issuer computing device 170 may be configured to generate an authentication value for each set of authentication information and compare the authentication values. If the difference between the authentication values is within a predetermined threshold, the cardholder may be authenticated. Although the determination of authenticating the cardholder's identity is described with respect to merchant device 140, payment processor 150, authentication computing device 160, and issuer computing device 170, it is also to be understood that user device 130 may retrieve the stored authentication profile to authenticate the cardholder by comparing the collected authentication information and the stored authentication information of the authentication profile. In such an embodiment, user device 130 may transmit an indication of successful or unsuccessful authentication of the cardholder to the payment processor 150 via first communication link 110.

After performing a successful authentication on the cardholder, the transaction may be authorized by issuer device 170, payment processor 150, and merchant device 140. Here, the transaction may processed and enter a transaction lifecycle including authorization, clearing, and settlement processes. However, if the authentication is unsuccessful (e.g., if no challenge response is received), the transaction may be declined by one of issuer device 170, payment processor 150, and merchant device 140. In other words, the authorization of the transaction may be declined. Accordingly, the transaction may not enter the transaction lifecycle and may be ended.

In at least some embodiments, client device 120 may be configured to detect whether or not the initiated purchase has been approved or declined. In certain embodiments, client device 120 may receive a notification indicating that the initiated purchase has been accepted or declined. For declined purchases, client device 120 may provide the initiator with a reason why the purchase was declined. For example, client device 120 may indicate that the cardholder declined the purchase at user device 130 in response to the purchase notification request.

Figure 3:
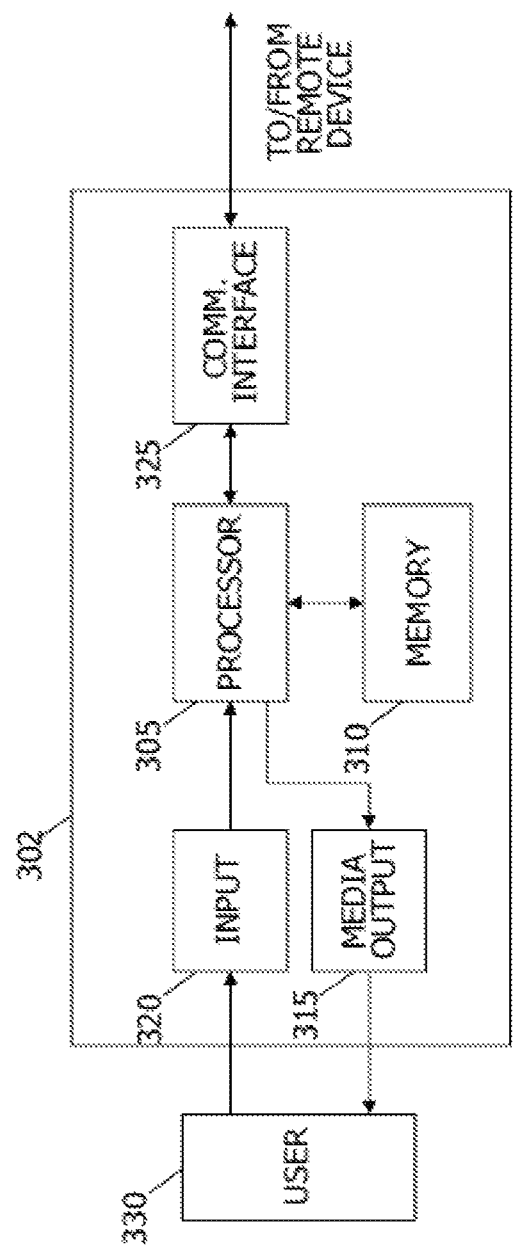

FIG. 3 depicts an exemplary configuration of a remote or user computing device 302, such as client device 120 and user device 130. Computing device 302 may include a processor 305 for executing instructions. In some embodiments, executable instructions may be stored in a memory area 310. Processor 305 may include one or more processing units (e.g., in a multi-core configuration). Memory area 310 may be any device allowing information such as executable instructions and/or other data to be stored and retrieved. Memory area 310 may include one or more computer-readable media. An authentication application, such as locked file 160 (shown in FIG. 2) may be stored in memory area 310.

Computing device 302 may also include at least one media output component 315 for presenting information to a user 330. Media output component 315 may be any component capable of conveying information to user 330. In some embodiments, media output component 315 may include an output adapter, such as a video adapter and/or an audio adapter. An output adapter may be operatively coupled to processor 305 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 315 may be configured to present an interactive user interface (e.g., a web browser or client application) to user 330.

In some embodiments, computing device 302 may include an input device 320 for receiving input from user 330. Input device 320 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 315 and input device 320.

Computing device 302 may also include a communication interface 325, which may be communicatively coupleable to a remote device such as merchant computing device 140 (shown in FIG. 2). Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 310 are, for example, computer-readable instructions for providing a user interface to user 330 via media output component 315 and, optionally, receiving and processing input from input device 320. A user interface may include, among other possibilities, a web browser and client application. Web browsers enable users 330 to display and interact with media and other information typically embedded on a web page or a website from a web server associated with a merchant. A client application allows users 330 to interact with a server application associated with, for example, a vendor or business.

Figure 4:
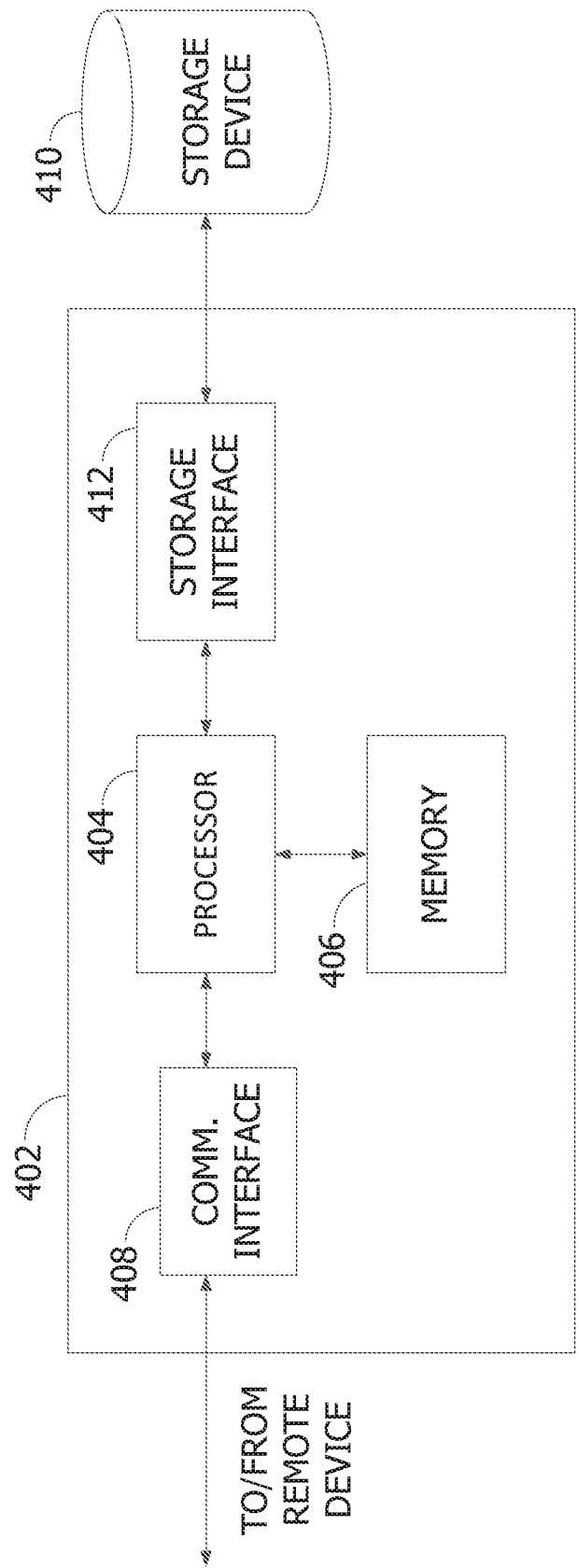

FIG. 4 depicts an exemplary configuration of a host computing device 402, such as authentication computing device 160. Host computing device 402 may include a processor 404 for executing instructions. Instructions may be stored in a memory area 406, for example. Processor 404 may include one or more processing units (e.g., in a multi-core configuration).

Processor 404 may be operatively coupled to a communication interface 408 such that host computing device 402 may be capable of communicating with a remote device such as computing device 302 shown in FIG. 3 or another host computing device 402. For example, communication interface 408 may receive requests from user computing device 302 via the Internet.

Processor 404 may also be operatively coupled to a storage device 410. Storage device 410 may be any computer-operated hardware suitable for storing and/or retrieving data. In some embodiments, storage device 410 may be integrated in host computing device 402. For example, host computing device 402 may include one or more hard disk drives as storage device 410. In other embodiments, storage device 410 may be external to host computing device 402 and may be accessed by a plurality of host computing devices 402. For example, storage device 410 may include multiple storage units such as hard disks or solid state disks in a redundant array of inexpensive disks (RAID) configuration. Storage device 410 may include a storage area network (SAN) and/or a network attached storage (NAS) system.

In some embodiments, processor 404 may be operatively coupled to storage device 410 via a storage interface 412. Storage interface 412 may be any component capable of providing processor 404 with access to storage device 410. Storage interface 412 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 404 with access to storage device 410.

Memory areas 310 (shown in FIG. 3) and 406 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 5:
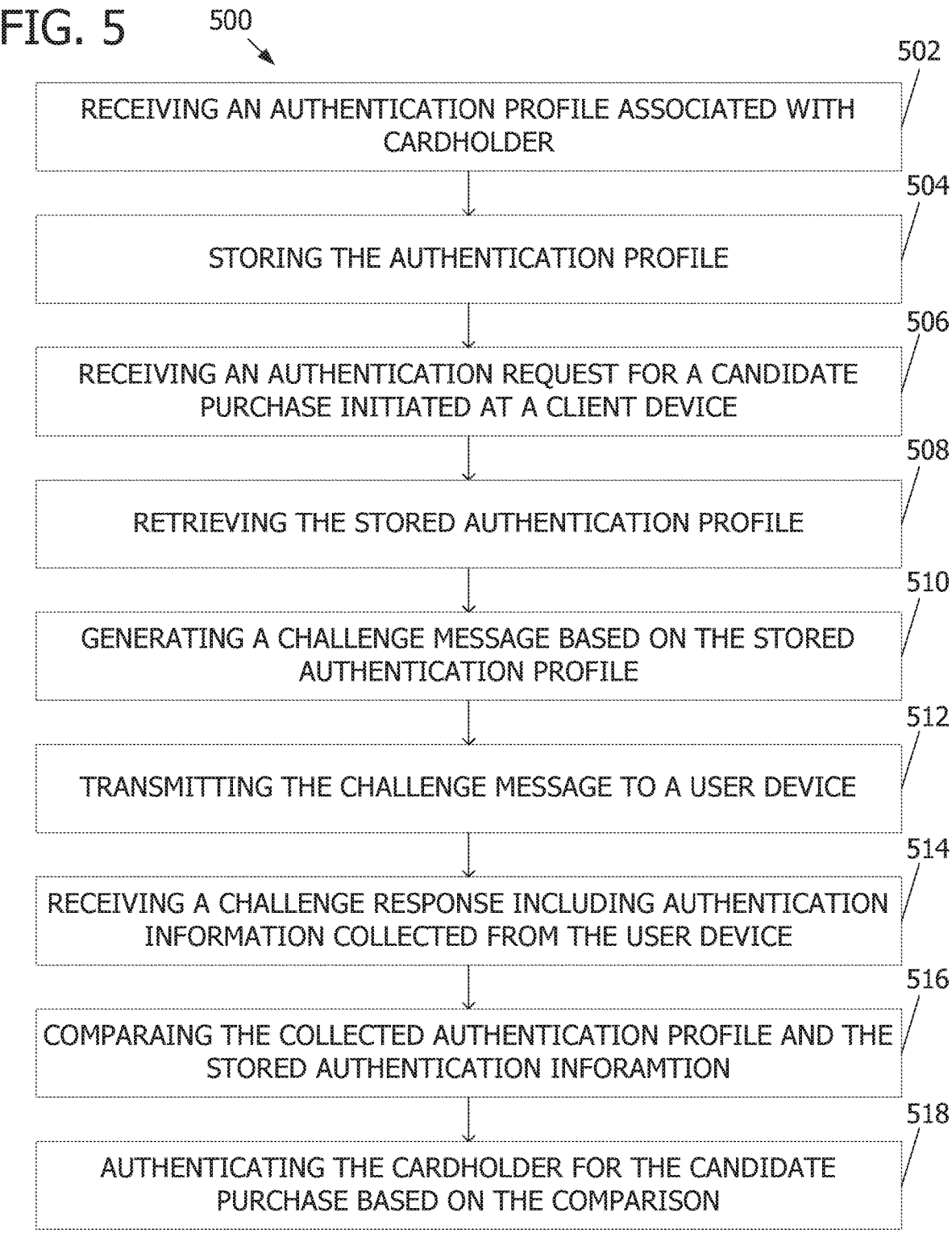

FIG. 5 is a flowchart of an example method 500 for authenticating a cardholder via a user device for remote purchases, performed by the authentication computing device of FIG. 2, in accordance with one example embodiment of the present disclosure. More specifically, the authentication computing device is configured to receive 502 an authentication profile for a cardholder including authentication information such as biometric or device information associated with the cardholder during an enrollment process for an authentication service and store 504 the authentication profile within a memory associated with the authentication computing device.

The authentication computing device is further configured to receive 506 an authentication request for a candidate purchase of the cardholder initiated at a client device. The authentication computing device receives the authentication request over a first communication link. The candidate purchase may be initiated by an initiator other than the cardholder, such as a child. In one embodiment, the client device is a gaming device. The authentication request may be based on a response from a user device to a purchase notification request. The response indicates whether or not the cardholder has approved the candidate purchase. The authentication computing device is further configured to retrieve 508 the stored authentication profile from the enrollment process, generate 510 a challenge message based on the stored authentication information, and transmit 512 the challenge message to the user device. In some embodiments, if the challenge message is transmitted to the merchant device or the issuer device, the challenge message is pushed to the user device by the merchant device or the issuer device. The challenge message is configured to cause the user device to collect authentication information, such as using a locked file or a paired device.

In the example embodiment, the authentication computing device is further configured to receive 514 a challenge response including the collected authentication information from the user device, compare 516 the collected authentication information to the authentication information within the stored authentication profile from the enrollment process, and authenticate 518 or decline the cardholder based on the comparison. In some embodiments, the authentication computing device may calculate an authentication score for each of the collected and stored authentication information. If the difference between the authentication scores is within a predetermined threshold (i.e., the collected and stored authentication information substantially match), the authentication computing device may authenticate the cardholder.

Once authenticated, the authentication computing device may notify the issuer device. The issuer device may authorize the candidate purchase in response to the cardholder's identity being authenticated.

In the example embodiment, method 500 enables a cardholder to review purchases initiated at the client device and approve or decline the purchases within a transaction lifecycle of the purchases. That is, method 500 enables the cardholder to approve purchases in near real-time or within a predetermined time (e.g., minutes or hours) of the purchases being initiated even if the cardholder is not present at the client device.

Figure 6:
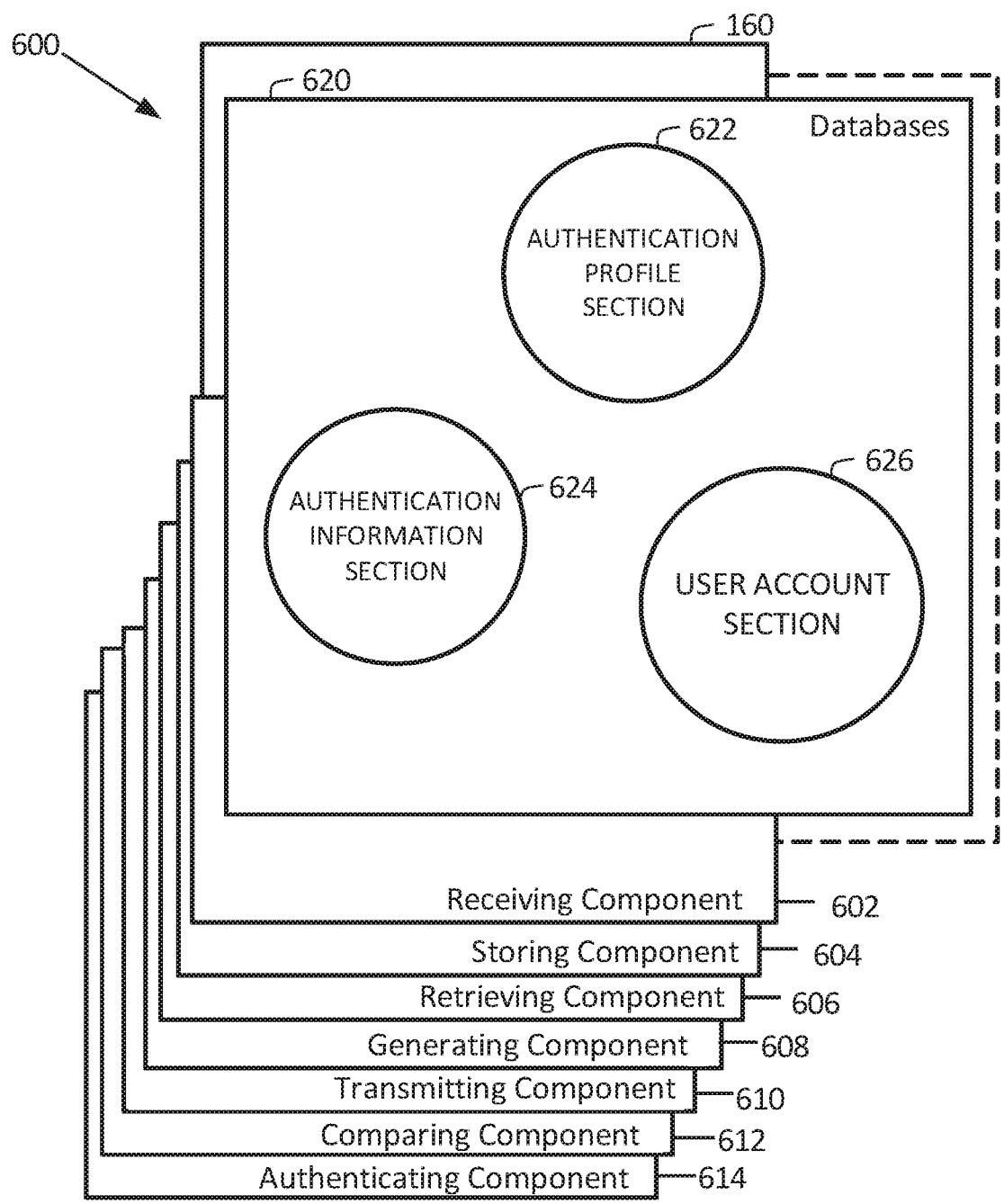

FIG. 6 is a diagram 600 of components of one or more example computing devices that may be used in the method shown in FIG. 5. FIG. 6 further shows a configuration of databases including at least database 620. Database 620 is coupled to several separate components within authentication computing device 160, which perform specific tasks.

Authentication computing device 160 includes a receiving component 602 configured to receive an authentication profile associated with the cardholder during an enrollment process for an authentication service, an authentication request for the candidate purchase, and a challenge response including authentication information collected from a user device. Authentication computing device 160 also includes a storing component 604 configured to store the authentication profile from the enrollment process within a memory and a retrieving component 606 configured to retrieve the stored authentication profile from the memory. Authentication computing device 160 additionally includes a generating component 608 configured to generate a challenge message based on the stored authentication profile and a transmitting component 610 configured to transmit the challenge message to the user device. Authentication computing device 160 further includes a comparing component 612 configured to compare the collected authentication information from the user device to the stored authentication profile from the enrollment process and an authenticating component 614 configured to authenticate the cardholder for the candidate purchase based on the comparison.

In an exemplary embodiment, database 620 is divided into a plurality of sections, including but not limited to, an authentication profile section 622, an authentication information section 624, and a user account section 626. These sections within database 620 are interconnected to update and retrieve the information as required.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for authenticating a cardholder for a candidate purchase using an authentication system including an authentication computing device and a merchant device associated with a merchant, the authentication computing device in communication with a memory, the method comprising:
   receiving, by the authentication computing device, an authentication profile associated with the cardholder during an enrollment process for an authentication service;
   storing the authentication profile within the memory;
   transmitting, to a user device associated with the cardholder, by the merchant device, a purchase request notification prompting the cardholder to review the candidate purchase, wherein the candidate purchase is initiated by an initiator at a client device;
   receiving, from the user device, at the merchant device, a cardholder response to the purchase request notification, the cardholder response indicating that the cardholder approves the candidate purchase and that the initiator is authorized by the cardholder to make the candidate purchase;
   sending, in response to the cardholder response, by the merchant computing device via a payment processing network, to the authentication computing device, an authentication request for the candidate purchase over a first communication link;
   retrieving, by the authentication computing device, in response to the authentication request, the stored authentication profile from the memory;
   generating, by the authentication computing device in response to the authentication request, a challenge message based on the stored authentication profile;
   transmitting, by the authentication computing device, the challenge message to the user device associated with the cardholder over a second communication link to authenticate the cardholder for the candidate purchase, the first communication link different than the second communication link, the user device different than the client device, wherein the challenge message is configured to cause the user device to request a paired device to collect authentication information and transmit the collected authentication information to the user device;

receiving, by the authentication computing device, a challenge response including authentication information associated with the cardholder collected from the user device;

comparing, by the authentication computing device, the collected authentication information to the stored authentication profile; and transmitting, by the authentication computing device, to an issuer device, a notification that the cardholder for the candidate purchase is authenticated based on the comparison.

2. The method in accordance with claim 1, wherein receiving the authentication request and generating the challenge message occur in near real-time.

3. The method in accordance with claim 1, wherein each of the stored authentication profile and the collected authentication information includes at least one of biometric information and device information associated with the cardholder.

4. The method in accordance with claim 1, wherein the challenge message is an encrypted message configured to be decrypted by a locked file on the user device, wherein the user device processes the challenge message to generate the challenge response.

5. The method in accordance with claim 1, wherein the purchase request notification includes information associated with the candidate purchase and prompts the cardholder to approve or decline the candidate purchase.

6. The method in accordance with claim 1, wherein the issuer device authorizes the candidate purchase in response to the cardholder being authenticated.

7. The method in accordance with claim 1, wherein the client device is a gaming device.

8. An authentication system for authenticating a cardholder for a candidate purchase associated with the cardholder, the authentication system comprising an authentication computing device and a merchant device associated with a merchant, wherein:

the authentication computing device is programmed to:
  receive an authentication profile associated with the cardholder during an enrollment process for an authentication service; and
  store the authentication profile within the memory;

the merchant device is programmed to:
  transmit, to a user device associated with the cardholder a purchase request notification prompting the cardholder to review the candidate purchase, wherein the candidate purchase is initiated by an initiator at a client device;
  receive, from the user device, a cardholder response to the purchase request notification, the cardholder response indicating that the cardholder approves the candidate purchase and that the initiator is authorized by the cardholder to make the candidate purchase; and
  send, in response to the cardholder response, via a payment processing network, to the authentication computing device, an authentication request for the candidate purchase over a first communication link; and the authentication computing device is further programmed to:
  retrieve, in response to the authentication request, the stored authentication profile from the memory;
  generate, in response to the authentication request, a challenge message based on the stored authentication profile;
  transmit the challenge message to the user device associated with the cardholder over a second communication link to authenticate the cardholder for the candidate purchase, the first communication link different from the second communication link, the user device different than the client device, wherein the challenge message is configured to cause the user device to request a paired device to collect authentication information and transmit the collected authentication information to the user device;
  receive a challenge response including an authentication profile associated with the cardholder collected from the user device;
  compare the collected authentication profile to the stored authentication profile; and
  transmit, to an issuer device, a notification that the cardholder for the candidate purchase is authenticated based on the comparison.

9. The authentication computing device in accordance with claim 8, wherein the authentication computing device is programmed to receive the authorization request and generate the challenge message in near real-time.

10. The authentication computing device in accordance with claim 8, wherein each of the stored authentication profile and the collected authentication information includes at least one of biometric information and device information associated with the cardholder.

11. The authentication computing device in accordance with claim 8, wherein the challenge message is an encrypted message configured to be decrypted by a locked file on the user device, wherein the user device processes the challenge message to generate the challenge response.

12. The authentication computing device in accordance with claim 8, wherein the purchase request notification includes information associated with the candidate purchase and prompts the cardholder to approve or decline the candidate purchase.

13. The authentication computing device in accordance with claim 8, wherein the issuer device authorizes the candidate purchase in response to the cardholder being authenticated.

14. The authentication computing device in accordance with claim 8, wherein the client device is a gaming device.

15. Non-transitory computer-readable storage media for authenticating a cardholder for a candidate purchase associated with the cardholder, the computer-readable storage media having a first set of computer-executable instructions embodied thereon for execution by an authentication computing device, and a second set of computer-executable instructions embodied thereon for execution by a merchant device associated with a merchant, wherein, when executed by the authentication computing device, the first set of computer-executable instructions cause the authentication computing device to:
  receive authentication profile associated with the cardholder from the cardholder during an enrollment process for an authentication service; and
  store the authentication profile in a memory in communication with the processor; and wherein the second set of computer-executable instructions, when executed by the merchant device, cause the merchant device to:
  transmit, to a user device associated with the cardholder, a purchase request notification prompting the cardholder to review the candidate purchase, wherein the candidate purchase is initiated by an initiator at a client device;

receive, from the user device, a cardholder response to the purchase request notification, the cardholder response indicating that the cardholder approves the candidate purchase and that the initiator is authorized by the cardholder to make the candidate purchase; and send, in response to the cardholder response, via a payment processing network, to the authentication computing device, an authentication request for the candidate purchase over a first communication link; and wherein the first set of computer-executable instructions, when executed by the authentication computing device, further cause the authentication computing device to:

retrieve, in response to the authentication request, the stored authentication profile associated with the cardholder from the memory;

generate, in response to the authentication request, a challenge message based on the stored authentication profile;

transmit the challenge message to the user device associated with the cardholder over a second communication link to authenticate the cardholder for the candidate purchase, the first communication link different from the second communication link, the user device different than the client device, wherein the challenge message is configured to cause the user device to request a paired device to collect authentication information and transmit the collected authentication information to the user device;

receive a challenge response including an authentication profile associated with the cardholder collected from the user device;

compare the collected authentication profile to the stored authentication profile; and transmit, to an issuer device, a notification that the cardholder for the candidate purchase based on the comparison.

16. The computer-readable storage media in accordance with claim 15, wherein each of the stored authentication profile and the collected authentication information includes at least one of biometric information and device information associated with the cardholder.

17. The computer-readable storage media in accordance with claim 15, wherein the challenge message is an encrypted message configured to be decrypted by a locked file on the user device, wherein the user device processes the challenge message to generate the challenge response.

18. The computer-readable storage media in accordance with claim 15, wherein the purchase request notification includes information associated with the candidate purchase and prompts the cardholder to approve or decline the candidate purchase.

19. The computer-readable storage media in accordance with claim 15, wherein the issuer device authorizes the candidate purchase in response to the cardholder being authenticated.

20. The computer-readable storage media in accordance with claim 15, wherein the client device is a gaming device.

* * * * *